(12) United States Patent
Gayon et al.

(10) Patent No.: US 8,393,663 B2
(45) Date of Patent: Mar. 12, 2013

(54) AUTOMOBILE GLOVE COMPARTMENT

(75) Inventors: David Gayon, L'Isle Adam (FR); Jean-Remi Billon, Paris (FR); Sergio Da Costa Pito, Cergy (FR); Jean-Pierre Morel, Boissy L'Aillerie (FR)

(73) Assignee: Faurecia Interieur Industrie, Nanterre (FR)

( * ) Notice: Subject to any disclaimer, the term of this patent is extended or adjusted under 35 U.S.C. 154(b) by 111 days.

(21) Appl. No.: 13/120,724

(22) PCT Filed: Sep. 25, 2009

(86) PCT No.: PCT/FR2009/051826
§ 371 (c)(1),
(2), (4) Date: Mar. 24, 2011

(87) PCT Pub. No.: WO2010/034953
PCT Pub. Date: Apr. 1, 2010

(65) Prior Publication Data
US 2011/0169292 A1    Jul. 14, 2011

(30) Foreign Application Priority Data

Sep. 26, 2008 (FR) .................................. 08 56493
Mar. 4, 2009 (FR) .................................. 09 51370

(51) Int. Cl.
*B60R 7/06* (2006.01)
(52) U.S. Cl. ..................................... 296/37.12; 312/246
(58) Field of Classification Search ................ 296/24.3, 296/24.34, 37.1, 37.8, 37.12; 312/245, 246
See application file for complete search history.

(56) References Cited

U.S. PATENT DOCUMENTS

| 2,796,310 A | 6/1957 | Anderson |
| 2,883,234 A | 4/1959 | Biondo |
| 4,368,866 A | 1/1983 | Urban |
| 4,596,416 A | 6/1986 | Muller |
| 4,630,857 A | 12/1986 | Zweiniger et al. |

(Continued)

FOREIGN PATENT DOCUMENTS

| DE | 3408978 A1 | 9/1985 |
| DE | 3432739 A1 | 3/1986 |

(Continued)

OTHER PUBLICATIONS

International Search Report, dated Jan. 5, 2010, from corresponding PCT application.

(Continued)

*Primary Examiner* — Lori Lyjak
(74) *Attorney, Agent, or Firm* — Young & Thompson

(57) ABSTRACT

An automobile glove compartment includes: a storage space (1) built into a dashboard and accessible through a main opening (2); a movable door (3); a tray (4) placed inside the storage space, the tray being slidable between a first position a), wherein the tray is stored in the storage space, and a second position b), wherein the tray is partially outside the storage space; and first tray-guiding elements (5), the first tray-guiding elements (5) each including a guiding element (10) projecting out from one of the respective side wall (7*a*, 7*b*) of the drawer (4), the guiding element (10) being insertable into a groove (11) built into one of the side walls (8*a*, 8*b*) of the glove compartment and slidable along the groove. The groove has a curved or angular shape enabling the sloping of the tray (4) towards the user when the tray (4) is partially outside the storage space.

14 Claims, 5 Drawing Sheets

U.S. PATENT DOCUMENTS

| | | | |
|---|---|---|---|
| 5,476,283 A | 12/1995 | Elton | |
| 5,558,385 A | 9/1996 | Gross et al. | |
| D485,801 S * | 1/2004 | Smith | D12/415 |
| 7,494,172 B2 * | 2/2009 | Herterich et al. | 296/37.8 |

FOREIGN PATENT DOCUMENTS

| | | |
|---|---|---|
| DE | 3926425 C1 | 9/1990 |
| EP | 0184620 A2 | 6/1986 |
| EP | 0721858 A | 7/1996 |
| EP | 1928699 A | 6/2008 |
| FR | 2752792 A1 | 3/1998 |
| WO | 93/11968 A1 | 6/1993 |

OTHER PUBLICATIONS

French Search Report, dated May 12, 1997, from corresponding French application.

* cited by examiner

AUTOMOBILE GLOVE COMPARTMENT

The invention relates to an automobile glove compartment.

Most of the automobiles are equipped with a glove compartment arranged inside the cab. Such glove compartment is fitted under the dashboard of the vehicle, on the passenger side, and is intended for the storage of various objects.

Such glove compartments comprise a storage space and a door that is movable with respect to the storage space between a shut position closing a main opening and an open position clearing the main opening.

Objects are often piled up in the bottom of the glove compartment and are not easily accessible. The user has first to remove the objects placed in the front of the glove compartment to accede to those stored in the bottom of the glove compartment.

Known solutions exist, such as that of the prior-art U.S. Pat. No. 2,796,310 consisting in providing a drawer that can slide between a first position in which the latter is stored in a storage space of the glove compartment and a second position in which the drawer is partially outside the storage space. This drawer is connected to the door by a connection means for synchronizing the movement of the door with that of the drawer.

Nevertheless, this solution is restricting because the drawer has to be almost entirely slid out of the storage space for the user can accede to the objects stored in the bottom of the drawer. This solution does not permit the use of very deep drawers.

One object of the invention is to make up for this drawback and to provide an automobile glove compartment offering an easy access to the objects placed in the bottom of the glove compartment.

For that purpose, the invention relates to an automobile glove compartment comprising a storage space built into a dashboard and accessible through a main opening, a door that is movable with respect to the storage space, a drawer arranged inside said storage space and comprising two side walls, said drawer being adapted to slide between a first position a), in which the latter is stored in the storage space, and a second position b), in which the drawer is partially outside the storage space, wherein the glove compartment further comprises first drawer guiding means arranged on each side of the latter, and two side walls, said first drawer guiding means each comprising a guiding member projecting out from one of the respective side walls of the drawer, and a groove integrated in one of the side walls of the glove compartment, said guiding member being adapted to engage into said groove and to slide along the latter.

According to the invention, each groove has a curved or angular shape adapted to permit the tilt of the drawer toward the user when the drawer is in position b), partially outside the storage space.

Therefore, the invention provides an automotive glove compartment offering an easy access to the objects placed in the bottom of the glove compartment.

In various possible embodiments, the present invention also relates to the following characteristics that may be considered either alone or in any technically possible combination and that each provides specific advantages:

the glove compartment comprising a lower wall, each groove has an angular shape and comprises two rectilinear sections, including a first rear section substantially parallel to the lower wall of the glove compartment, and a second front section tilted with respect to the lower wall of the glove compartment, said tilted second front section extending forward and toward the lower wall of the glove compartment, said groove being positioned substantially half the way between the bottom of the glove compartment and the main opening.

Advantageously, the drawing having a front wall, and a rear wall, the rear wall has a greater height than that of the front wall.

said groove having a circular arc curved shape, the front end of said groove being closer to the lower wall of the glove compartment than its rear end, the glove compartment comprises two sliding connection means that connect the door to the drawer, said sliding connection means being arranged on each side of the drawer and being adapted for synchronizing the movement of the drawer with that of the door, each sliding connection means is positioned on the front side of the glove compartment, said sliding connection means being fixed to the door at one of its ends and connected to an articulation by the other one of its ends, said articulation being detachably connected to the drawer, at the vicinity of the upper edge thereof, and comprising said guiding member of the first drawer guiding means, and said curved groove being positioned at the level of the upper front part of the storage space, the glove compartment comprises second drawer guiding means arranged on each side of the drawer, said second drawer guiding means being positioned at the back of the glove compartment and at the level of the upper part of the storage space, said second drawer guiding means each comprise a guiding member arranged on the respective side walls of the drawer, each guiding member being adapted to slide along a rectilinear groove integrated in one of the respective side walls of the glove compartment, in order to permit the guidance of the drawer back, said guiding members of said first drawer guiding means and said guiding members of said second drawer guiding means are pins, said guiding members of said first drawer guiding means and said guiding members of said second drawer guiding means are rollers that are rotationally movable in the groove associated thereto, said rollers being rotationally movable around an axis fixed to the respective side walls of the drawer, each of the side walls of the glove compartment comprises:
  an access groove having two ends, including one front end and one rear end, each access groove opening into the front face of the glove compartment at its front end, and being connected to the groove of the first drawer guiding means at its rear end, and
  an intermediate groove connecting the groove of the first drawer guiding means to the groove of the second drawer guiding means, said guiding members of said second drawer guiding means being adapted to engage into the access grooves and to slide up to the groove of the second drawer guiding means, and said guiding members of the first drawer guiding means being adapted to engage into the access grooves and to slide up to the groove of the first drawer guiding means.

These means permit an easy and quick assembling/disassembling of the drawer. The drawer can be extracted from the glove compartment and be inserted easily and quickly therein. The drawer can be quickly disassembled in order, for example, to accede to the airbag. It is no longer necessary to disassemble entirely the glove compartment to extract the drawer.

The access to the objects placed in the bottom of the drawer is also made easier. Indeed, when objects remains jammed or stuck in the bottom of the drawer, these means permit the drawer to be further slid toward the passenger so as to allow the latter to get his/her objects back.

the glove compartment comprises a glove compartment body, said glove compartment body comprising only one front intended to face the passenger of the vehicle, said two side walls and one upper wall.

These means provide a storage space with a greater volume (10 L to 15 L, or even more), and a lighter-weight glove compartment. The access to the parts arranged behind the glove compartment, such as the airbag for example, is made easier.

These means also provide access to objects having fallen from the drawer, when the latter is too filled.

The invention will now be described in more detail with reference to the appended drawings in which.

Figure 1:
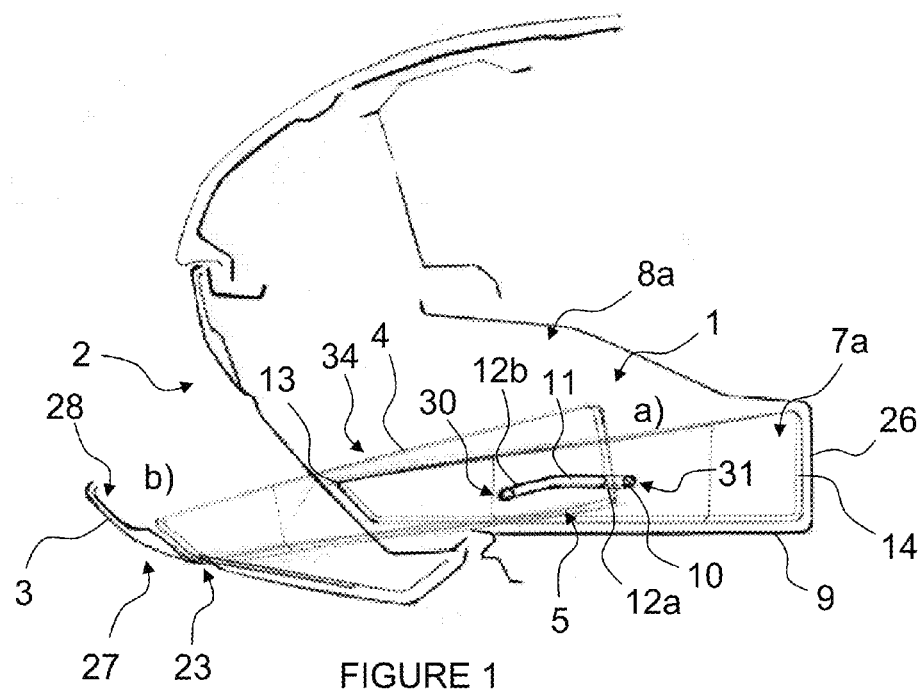
FIG. 1 shows a glove compartment provided with a drawer, according to a first embodiment of the invention.

This glove compartment comprises a storage space 1 built into a dashboard and accessible through a main opening 2. The glove compartment has two opposite side walls 8a, 8b, a lower wall 9, an upper wall 25 and a bottom 26.

The glove compartment also comprises a door 3 that is movable with respect to the storage space 1, and a device for locking the door in the shut position (not shown in FIG. 1). This locking device permits to hold the door in the shut position. The door 3 has a front face 27 and a rear face 28.

The glove compartment comprises an articulation connecting the door 3 to the remaining of the glove compartment and allowing the door 3 to be rotationally movable with respect to the storage space 1, between a shut position and an open position.

The glove compartment comprises a drawer 4 arranged inside the storage space 1. This drawer 4 comprises two side walls 7a, 7b, an upper edge 34, and is adapted to slide between a first position a), in which the latter is stored in the storage space 1, and a second position b), in which it is partially outside the storage space 1.

The glove compartment comprises two first drawer guiding means 5 arranged symmetrically on each side of the drawer.

Those first drawer guiding means 5 each comprise a guiding member 10 projecting out from one of the respective side walls 7a, 7b of the drawer 4, and a groove 11 that is integrated in one of the side walls 8a, 8b of the glove compartment. This guiding member 10 is adapted to engage into said groove 11 and to slide along the latter.

Figure 6:
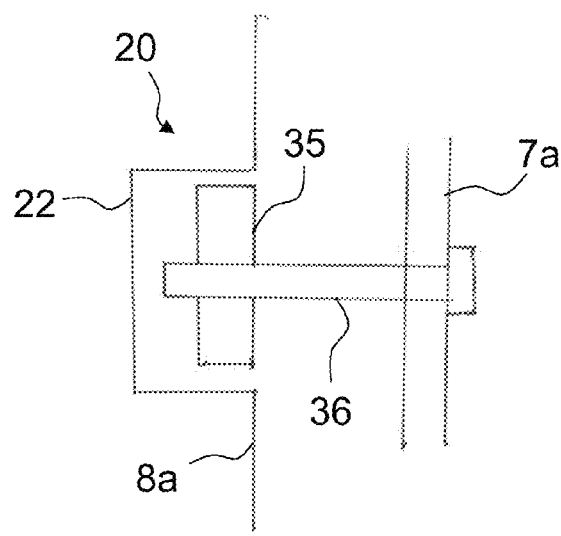
FIG. 6 shows a guiding member according to a possible embodiment.

That guiding member 10 is preferentially a pin, but it can also be a roller, as illustrated in FIG. 6.

The groove 11 has a curved or angular shape adapted to permit the tilt of the drawer 4 toward the user when the drawer 4 is partially outside the storage space 1. The front end 30 of the groove 11 is closer to the plane formed by the lower wall 9 of the glove compartment than its rear end 31. In other words, the front end 30 of the groove 11 is lower than the rear end 31 thereof.

In the example of FIG. 1, the groove 11 has an angular shape and comprises two rectilinear sections 12a, 12b, including a first rear section 12a substantially parallel to the lower wall 9 of the glove compartment, and a second front section 12b, tilted with respect to the lower wall 9 of the glove compartment. The tilted second front section 12b extends forward and toward the lower wall 9 of the glove compartment.

When the guiding members 10 slide along the first rear sections 12a of the respective grooves 11, the drawer 4 follows a linear movement parallel to the lower wall 9 of the glove compartment.

When the guiding members 10 slide along the tilted second front sections 12b of the glove compartment, the drawer 4 tilts with respect to the lower wall 9 of the glove compartment and toward the passenger. The guiding members 10 are rotationally movable within the grooves 11, which makes this tilt possible.

Preferentially, less than half of the drawer 4 goes out from the storage space 1 when the drawer 4 is in position b), outside the storage space 1.

Preferentially, the grooves 11 are positioned substantially half the way between the bottom of the glove compartment 26 and the main opening 2.

Each second front section 12b of the grooves 11 is tilted by an angle comprised between 2° and 30° with respect to the first rear section 12a of the grooves 11.

Advantageously, this angle is comprised between 5° and 10°, allowing a small tilt of the drawer 4 when the latter is in position b).

The drawer 4 has a front wall 13, and a rear wall 14 of greater height than that of the front wall 13.

The shape of the storage space 1 (for example, its height) is adapted to permit the free displacement of the rear part of the drawer 4 between the positions a) and b).

In position b) in which the drawer 4 is partially outside the storage space 1, the lower edge 23 of the latter rests on the rear face 28 of the door.

The rear face 28 of the door may advantageously have a counter-shape adapted to the shape of the front wall 13 of the drawer 4, in order to hold stably the latter in position b).

In this example, the drawer 4 is operated manually. When the door 3 is open, the user pulls the drawer 4 toward himself/ herself up to the position b), in which the drawer 4 is partially outside the storage space 1.

With the drawer in position b), the door 3 can be shut quickly, while simultaneously carrying along the drawer 4 to its stored position a).

Figure 2:
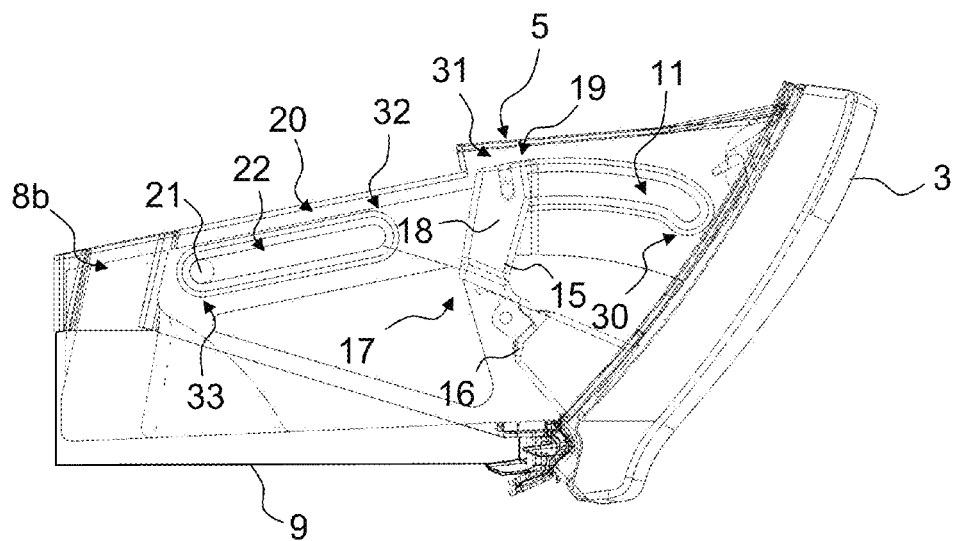
FIG. 2 shows a glove compartment provided with a drawer in position a), in which the latter is stored in the storage space, according to a second embodiment of the invention.
Figure 3:
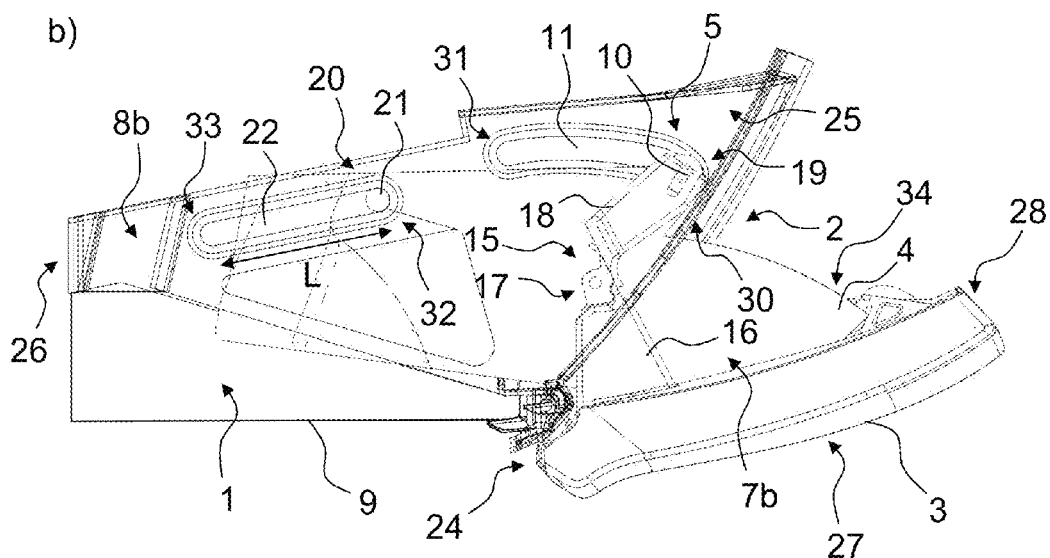
FIG. 3 shows a glove compartment provided with a drawer in position b), in which the drawer is partially outside the storage space, according to the second embodiment of the invention.

FIGS. 2 and 3 show a glove compartment provided with a drawer 4, according to a second embodiment of the invention.

FIG. 2 shows the glove compartment when the drawer is in position a), in which the latter is stored in the storage space.

FIG. 3 shows this glove compartment when the drawer is in position b), in which the drawer is partially outside the storage space.

Figure 4:
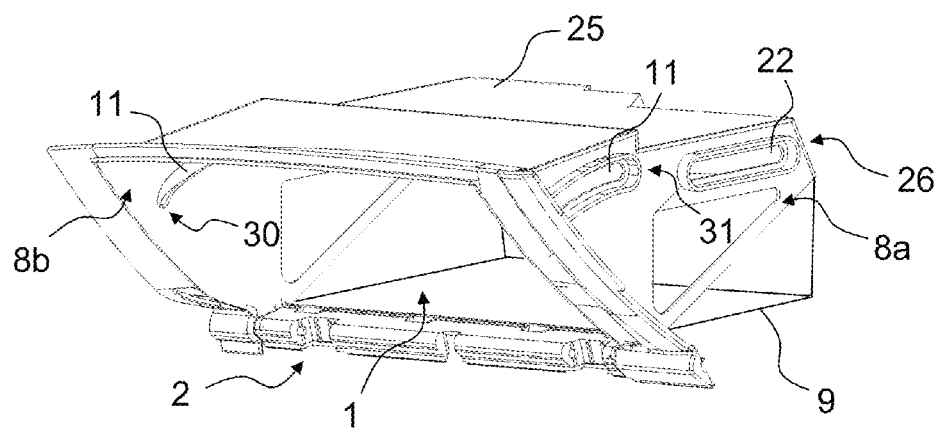
FIG. 4 shows the casing of the glove compartment according to the second embodiment of the invention.

In this example, the groove 11 has a circular arc curved shape as illustrated in FIGS. 2-4. The inside of this groove 11 (concave portion) is oriented toward the lower wall 9 of the glove compartment.

The grooves 11 may consist in curved openings or slits formed in the respective side walls 8a, 8b of the glove compartment.

The glove compartment comprises two sliding connection means 15 that connect the door 3 to the drawer 4 and that are arranged on each side of the latter. These sliding connection means 15 are adapted for synchronizing the movement of the drawer 4 with that of the door 3. The opening of the door 3 carries along the displacement of the drawer 4.

Each sliding connection means 15 is positioned on the front side of the glove compartment and has an angular section 17. The sliding connection means 15 has a generally "V" shape.

The sliding connection means 15 is fixed to the door 3 at one of its ends and is connected to an articulation 19 by the other one of its ends.

More precisely, each sliding connection means 15 comprises a lower arm 16 fixed to the door 3 at one of its ends. More particularly, this lower arm 16 is fixed in the vicinity of the rear edge 24 of the door.

This lower arm 16 is connected, at the other one of its ends, to an upper arm 18, the latter being connected to the articulation 19.

When the drawer 4 is in position a), in which the latter is stored in the storage space 1, the upper arm 18 is substantially perpendicular to the lower wall 9 of the glove compartment. As for the lower arm 16, it is substantially perpendicular to the front and rear walls of the door 3.

The articulation 19 is detachably connected to the drawer 4, in the vicinity of the upper edge 34 thereof, and comprises the guiding member 10 of the first drawer guiding means 5. The curved groove 11 is positioned at the upper front part of the storage space 1.

Preferentially, the centre of the circular arc described by this groove 11 is positioned substantially at the articulation connecting the door 3 to the rest of the glove compartment.

Figure 5:
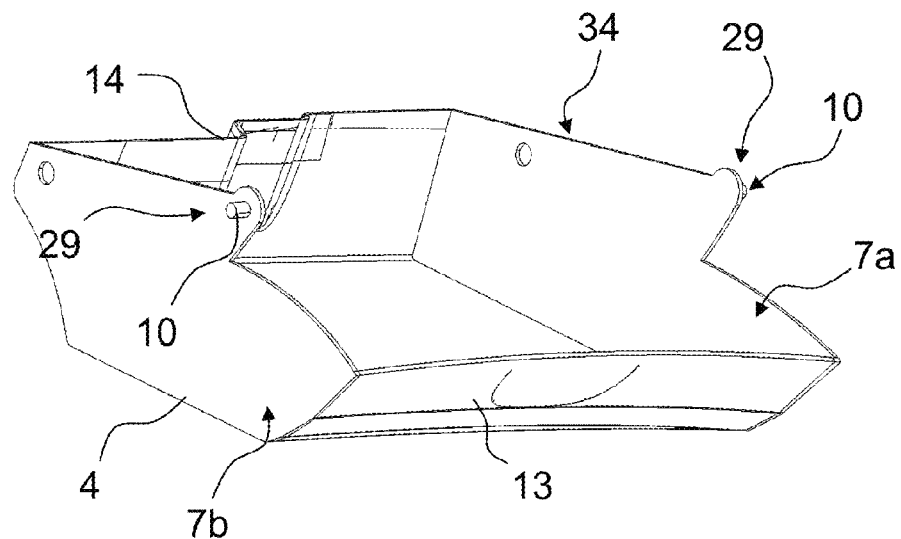
FIG. 5 shows the drawer of the glove compartment according to the second embodiment of the invention.

FIG. 5 shows an example of drawer 4 of the glove compartment according to the second embodiment of the invention. In FIG. 5, only the guiding members 10 of the first drawer guiding means 5 are shown.

These guiding means 10 are each arranged on a protrusion 29 projecting out from the upper edge 34 of the drawer, parallel to the side walls 7a, 7b of the drawer, and outward of the latter. Each protrusion 29 is slightly tilted toward the front wall 13 of the drawer.

The upper edge 34 of the drawer has a downward shoulder, at this protrusion 29, so that a drawer 4 is obtained, which has a front wall 13 with a lower height than that of its rear wall 14.

The glove compartment comprises second drawer guiding means 20 arranged on each side of the drawer 4. The second drawer guiding means 20 are positioned at the back of the glove compartment and at the upper part of the storage space 1.

The second drawer guiding means 20 each comprise a guiding member 21 arranged on the respective side walls of the drawer 7a, 7b. Each guiding member 21 is adapted to slide along a rectilinear groove 22 integrated in one of the respective side walls 8a, 8b of the glove compartment, in order to permit the guidance of the back of the drawer 4.

In one possible embodiment, shown in FIG. 5, this guiding member 21 is a pin.

In another possible embodiment, shown in FIG. 6, the guiding members 21 of the second drawer guiding means 20 are rollers 35 that are rotationally movable in the groove 22 associated thereto.

The guiding members 10 of the first drawer guiding means 5 can also be rollers 35 that are rotationally movable in the groove 11 associated thereto.

These rollers 35 are rotationally movable around an axis 36 fixed to the respective side walls 7a, 7b of the drawer.

The grooves 11, 22 can open to the outside of the glove compartment or not open to the outside of the glove compartment.

The rectilinear groove 22 is tilted with respect to the plane formed by the lower wall 9 of the glove compartment. The rear end 33 of the rectilinear groove 22 is closer to the lower wall 9 of the glove compartment than its front end 32.

The drawer 4 can slide over a distance L comprised between 30 mm and 150 mm, and preferentially over a distance of 95 mm. For example, an opening angle of the door of 43.75° corresponds to a displacement of the drawer 4 of 94.21 mm. The greater is the opening angle of the door, the longer is the stroke of the drawer 4. The drawer 4 can tilt over an angle comprised between 5° and 20°, preferentially of 10°, with respect to the lower wall 9 of the glove compartment.

The effective volume of the glove compartment is increased by at least 25%. For example, this effective volume may pass from 73% to 98% using the invention.

The drawer 4 may be divided into sections, which avoids that the objects move during the tilt of the drawer 4.

Figure 7:
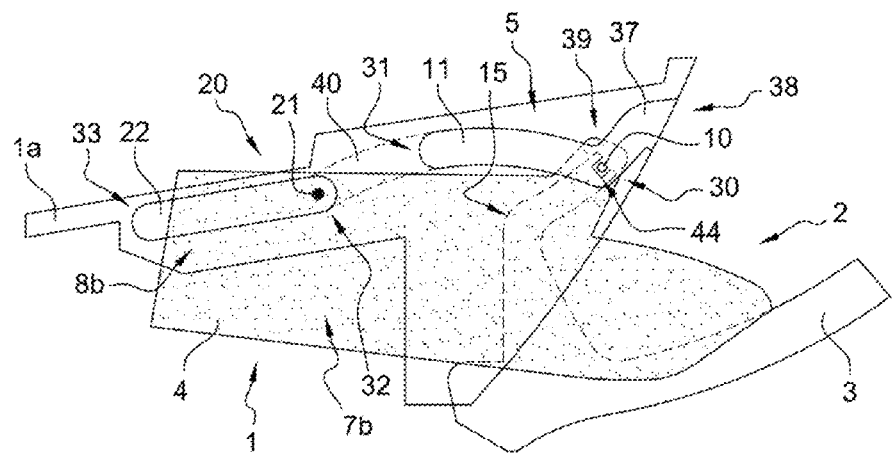
FIG. 7 shows a glove compartment with an easily-extractible drawer, according to a third embodiment of the invention.

FIG. 7 shows a glove compartment allowing the drawer 4 to be easily and quickly extracted and inserted from/into the latter, according to a third embodiment of the invention.

Each of the side walls 8a, 8b of the glove compartment comprises an access groove 37 having two ends, including a front end 38 and a rear end 39. Each access groove 37 opens into the front face of the glove compartment at its front end 38, and is connected to the groove 11 of the first drawer guiding means 5 at its rear end 39.

Preferentially, the rear end 39 of each access groove 37 is connected to the front end 30 of the groove 11 of the first drawer guiding means 5.

These access grooves 37 may consist in slits and be curved, with a generally S shape.

Preferentially, the open front end 38 of each access groove 37 is located above the front end 30 of the groove 11 of the first drawer guiding means 5. At this front end 38, the access grooves 37 have a substantially flared V shape.

Each of the side walls 8a, 8b of the body 1a of the glove compartment comprises an intermediate or transition groove 40, connecting the groove 11 of the first drawer guiding means 5 to the groove 22 of the second drawer guiding means 20.

Preferentially, one of the ends of the intermediate groove 40 is connected to the front end 32 of the groove 22 of the second drawer guiding means 20, and the other one of its ends is connected to the rear end 31 of the groove 11 of the first drawer guiding means 5.

Each guiding member 21 of the second drawer guiding means 20 is adapted to engage into one of the access grooves 37, then to slide along the groove 11 of the first drawer guiding means 5, then along the intermediate groove 40, up to the groove 22 of the second drawer guiding means 20.

Each guiding member 10 of the first drawer guiding means 5 is adapted to engage into one of the access grooves 37 and to slide up to the groove 11 of the first drawer guiding means 5.

The access grooves 37, the grooves 11 of the first drawer guiding means 5, the intermediate grooves 40 and the grooves 22 of the second drawer guiding means 20 form a continuous channel.

Figure 8:
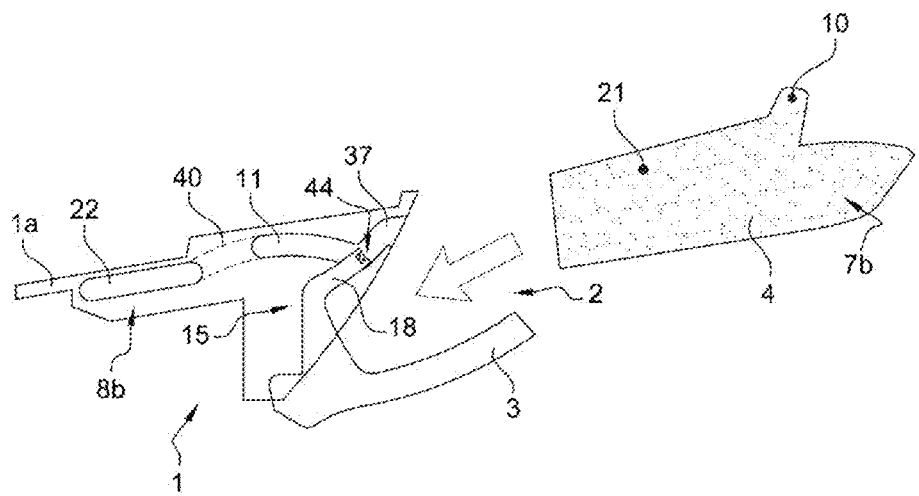
FIG. 8 shows this drawer when extracted from the glove compartment, according to the third embodiment of the invention.

FIG. 8 shows the drawer 4 when extracted from the glove compartment. This continuous channel allows the drawer 4 to be quickly assembled and disassembled.

The guiding members 10 of the first drawer guiding means 5 comprise axes, which are longer than those of the guiding members 21 of the second drawer guiding means 20.

The upper arms 18 of the sliding connection means 15 or limiters end by a slit 44, forming a fork capable of receiving one of the guiding members 10 of the first drawer guiding means 5.

Once the drawer 4 assembled in the glove compartment body 1a, the axes of the guiding members 10 of the first drawer guiding means 5 protrude from the glove compartment body 1a. The guiding members 10 of the first drawer guiding means 5 can then engage into the slit 44 of the sliding connection means 15.

When the glove compartment comprises only the first drawer guiding means 5, it comprises only access grooves 37 and no intermediate grooves 40.

The glove compartment can comprise a glove compartment body 1a. In the above-described examples, the glove compartment body 1a has a vessel shape and comprises the grooves 11 of the first drawer guiding means 5 and the grooves 22 of the second drawer guiding means 20. The glove compartment body 1a may also comprise intermediate grooves 40 and access grooves 37.

Figure 9:
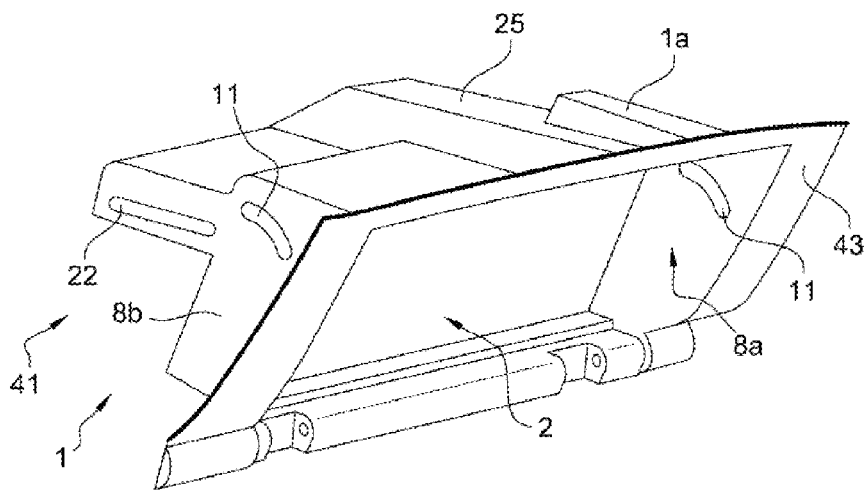
FIG. 9 shows a lighter-weight glove compartment body, according to a fifth embodiment of the invention.
Figure 10:
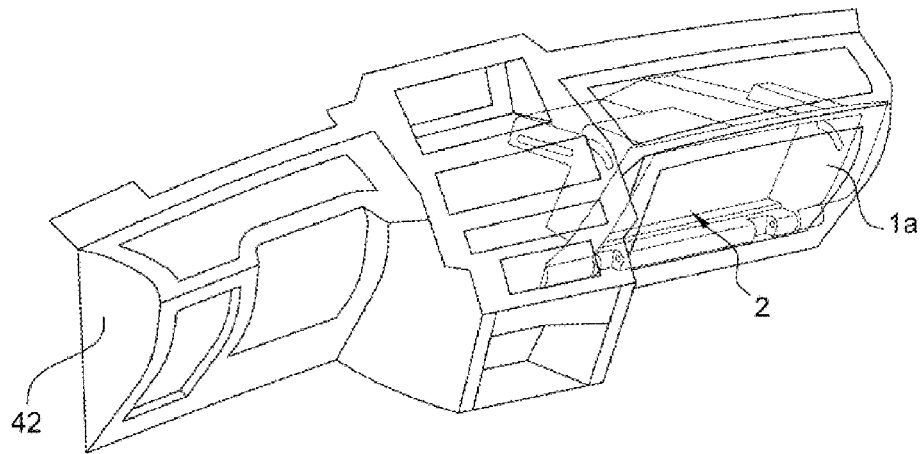
FIG. 10 shows this lighter-weight glove compartment body when assembled into a dashboard.

FIGS. 9 and 10 show a glove compartment according to a fourth embodiment of the invention.

The bottom of the glove compartment may comprise one or several recesses 41 that are hidden by the removable drawer 4.

In particular, the glove compartment body 1a may comprise no bottom or rear wall, nor lower wall, in order to simplify its design and to lighten it.

FIG. 9 shows a glove compartment body 1a comprising only one recess 41 that merges with the storage space 1. FIG. 10 shows this glove compartment body 1a when it is assembled into a dashboard 42.

The glove compartment body 1a comprises only one front 43 intended to face the passenger of the vehicle, two side walls 8a, 8b comprising the grooves or slits described with reference to all the previous possible embodiments, and an upper wall 25.

The presence of the upper wall 25 permits to keep the rigidity of the glove compartment body 1a.

In another possible embodiment, the glove compartment body may be eliminated, the various grooves being integrated directly in the dashboard 42.

The absence of bottom and lower wall permits to offer a storage space 1 with a greater volume (10 L to 15 L, or even more). The drawer 4 can move with a greater travel.

Moreover, the invention provides a glove compartment that is lighter in weight and more accessible (access to the airbag, for example).

Therefore, the invention provides a lighter-weight automobile glove compartment, which offers an easy access to the objects placed in the bottom of the glove compartment, and an easy assembling/disassembling of the drawer.

The invention claimed is:

1. An automobile glove compartment comprising:
   a storage space (1) built into a dashboard and accessible through a main opening (2),
   a door (3) that is movable with respect to the storage space (1),
   a drawer (4) arranged inside said storage space (1) and comprising two side walls (7a, 7b), said drawer (4) being adapted to slide between a first position (a), in which the latter is stored in the storage space (1), and a second position (b), in which the drawer (4) is partially outside the storage space (1),
   a first means for drawer guiding (5) arranged on each side of the latter, and two side walls (8a, 8b), said first drawer guiding means (5) each comprising a first guiding member (10) projecting out from one of the respective side walls (7a, 7b) of the drawer (4), and a first groove (11) integrated in one of the side walls (8a, 8b) of the glove compartment, said first guiding member (10) being adapted to engage into said first groove (11) and to slide along the latter,
   wherein the first groove (11) has a curved or angular shape adapted to permit the tilt of the drawer (4) toward the user when the drawer (4) is in the second position (b), partially outside the storage space (1).

2. The automobile glove compartment according to claim 1,
   wherein said glove compartment comprises a lower wall (9),
   wherein the first groove (11) has an angular shape and comprises two rectilinear sections (12a, 12b), including a first rear section (12a) substantially parallel to the lower wall (9) of the glove compartment, and a second front section (12b) tilted with respect to the lower wall (9) of the glove compartment, said tilted second front section (12b) extending forward and toward the lower wall (9) of the glove compartment.

3. The automobile glove compartment according to claim 1, wherein said first groove (11) has a circular arc curved shape, a front end (30) of said first groove (11) being closer to the lower wall of the glove compartment than its rear end (31).

4. The automobile glove compartment according to claim 3, further comprising two means for slideably connecting (15) that connect the door (3) to the drawer (4), said means for slideably connecting (15) being arranged on each side of the drawer (4) and being adapted to synchronize movement of the drawer (4) with that of the door (3).

5. The automobile glove compartment according to claim 4, wherein each means for slideably connecting (15) is positioned on a front side of the glove compartment, said means for slideably connecting (15) being fixed to the door (3) at one of two ends and connected to an articulation (19) by an other one of the two ends, said articulation (19) being detachably connected to the drawer (4), at a vicinity of the upper edge (34) thereof, and comprising said first guiding member (10) of the first drawer guiding means (5), and said curved groove (11) being positioned at the level of the upper front part of the storage space (1).

6. The automobile glove compartment according to claim 1, further comprising second means for drawer guiding (20) arranged on each side of the drawer (4), said second drawer guiding means (20) being positioned at a back of the glove compartment and at a level of an upper part of the storage space (1).

7. The automobile glove compartment according to claim 6, wherein said second means for drawer guiding (20) each comprise a second guiding member (21) arranged on the respective side walls (7a, 7b) of the drawer, each second guiding member (21) being adapted to slide along a rectilinear groove (22) integrated in one of the respective side walls (8a, 8b) of the glove compartment, in order to permit the guidance of the drawer back.

8. The automobile glove compartment according to claim 1, wherein said first guiding members (10) of said first means for drawer guiding (5) and second guiding members (21) of a second means for drawer guiding (20) are rollers (35) that are rotationally movable in the groove associated thereto, said rollers (35) being rotationally movable around an axis (36) fixed to the respective side walls (7a, 7b) of the drawer.

9. The automobile glove compartment according to claim 6, wherein each of the side walls (8a, 8b) of the glove compartment comprises:
   an access groove (37) having two ends, including one front end (38) and one rear end (39), the access groove (37) opening into a front face of the glove compartment at the one front end (38), and being connected to the first groove (11) of the first means for drawer guiding (5) at the one rear end (39), and
   an intermediate groove (40) connecting the first groove (11) of the first means for drawer guiding (5) to a second groove (22) of the second drawer guiding means (20), said second guiding members (21) of said second means for drawer guiding (20) being adapted to engage into the access groove (37) and to slide up to the second groove (22) of the second drawer guiding means (20), and said first guiding members (10) of the first means for drawer guiding (5) being adapted to engage into the access groove (37) and to slide up to the groove (11) of the first means for drawer guiding (5).

10. The automobile glove compartment according to claim 3, further comprising a glove compartment body (1a), said glove compartment body (1a) comprising only one front (43) intended to face the passenger of the vehicle, said two side walls (8a, 8b), and one upper wall (25).

11. The automobile glove compartment according to claim 2, further comprising second means for drawer guiding (20) arranged on each side of the drawer (4), said second means for drawer guiding (20) being positioned at a back of the glove compartment and at the level of the upper part of the storage space (1).

12. The automobile glove compartment according to claim 2, wherein said first guiding members (10) of said first means for drawer guiding (5) and second guiding members (21) of a second means for drawer guiding (20) are rollers (35) that are rotationally movable in the first groove (11) and a second groove (22) respectively, said rollers (35) being rotationally movable around an axis (36) fixed to the respective side walls (7a, 7b) of the drawer.

13. The automobile glove compartment according to claim 7, wherein each of the side walls (8a, 8b) of the glove compartment comprises:
   an access groove (37) having two ends, including one front end (38) and one rear end (39), the access groove (37) opening into a front face of the glove compartment at the one front end (38), and being connected to the first groove (11) of the first means for drawer guiding (5) at the one rear end (39), and
   an intermediate groove (40) connecting the first groove (11) of the first means for drawer guiding (5) to a second groove (22) of the second drawer guiding means (20), said second guiding members (21) of said second means for drawer guiding (20) being adapted to engage into the access groove (37) and to slide up to the second groove (22) of the second drawer guiding means (20), and said first guiding members (10) of the first means for drawer guiding (5) being adapted to engage into the access groove (37) and to slide up to the groove (11) of the first means for drawer guiding (5).

14. The automobile glove compartment according to claim 8, wherein each of the side walls (8a, 8b) of the glove compartment comprises:
   an access groove (37) having two ends, including one front end (38) and one rear end (39), the access groove (37) opening into a front face of the glove compartment at the one front end (38), and being connected to the first groove (11) of the first means for drawer guiding (5) at the one rear end (39), and
   an intermediate groove (40) connecting the first groove (11) of the first means for drawer guiding (5) to a second groove (22) of the second drawer guiding means (20), said second guiding members (21) of said second means for drawer guiding (20) being adapted to engage into the access groove (37) and to slide up to the second groove (22) of the second drawer guiding means (20), and said first guiding members (10) of the first means for drawer guiding (5) being adapted to engage into the access groove (37) and to slide up to the groove (11) of the first means for drawer guiding (5).

\* \* \* \* \*